(12) United States Patent
Liang (10) Patent No.: US 11,237,446 B2
(45) Date of Patent: Feb. 1, 2022

(54) OPTICAL ASSEMBLY, OPTICAL DEVICE, AND MANUFACTURING METHOD THEREOF

(71) Applicant: BOE TECHNOLOGY GROUP CO., LTD., Beijing (CN)

(72) Inventor: Pengxia Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 186 days.

(21) Appl. No.: 15/574,020

(22) PCT Filed: Mar. 10, 2017

(86) PCT No.: PCT/CN2017/076247
§ 371 (c)(1),
(2) Date: Nov. 14, 2017

(87) PCT Pub. No.: WO2018/040533
PCT Pub. Date: Mar. 8, 2018

(65) Prior Publication Data
US 2018/0299708 A1 Oct. 18, 2018

(30) Foreign Application Priority Data
Aug. 31, 2016 (CN) .......................... 201610788737.3

(51) Int. Cl.
*G02F 1/137* (2006.01)
*G02F 1/133* (2006.01)
(Continued)

(52) U.S. Cl.
CPC ............ *G02F 1/137* (2013.01); *E06B 3/6722* (2013.01); *E06B 9/24* (2013.01); *G02F 1/1334* (2013.01);
(Continued)

(58) Field of Classification Search
None
See application file for complete search history.

(56) References Cited

U.S. PATENT DOCUMENTS 5,105,303 A * 4/1992 Ilhage ............... B32B 17/10036
359/265
5,673,092 A * 9/1997 Horie ................. G02F 1/133371
349/86
(Continued)

FOREIGN PATENT DOCUMENTS

CN 1550848 A 12/2004
CN 101059607 A 10/2007
(Continued)

OTHER PUBLICATIONS

International Search Report dated May 31, 2017, issued in counterpart International Application No. PCT/CN2017/076247 (12 pages).
(Continued)

*Primary Examiner* — Edward J Glick
*Assistant Examiner* — Anthony G Quash
(74) *Attorney, Agent, or Firm* — Westerman, Hattori, Daniels & Adrian, LLP (57) ABSTRACT

An optical assembly for an optical device. The optical assembly comprises a first substrate and a second substrate opposite the first substrate. A dimming structure is disposed between the first substrate and the second substrate. A light shielding structure is disposed on a surface of the second substrate opposite to the first substrate. The light shielding structure is configured to absorb at least one of ultraviolet light, near-ultraviolet light, infrared light, or far-infrared light in the sunlight and output an electrical control signal, and the dimming structure is configured to adjust light transmittance in response to the electrical control signal.

16 Claims, 8 Drawing Sheets

(51) Int. Cl.
  *G02F 1/1334* (2006.01)
  *G02F 1/1335* (2006.01)
  *G02F 1/1343* (2006.01)
  *E06B 9/24* (2006.01)
  *E06B 3/67* (2006.01)
  *G02F 1/1333* (2006.01)

(52) U.S. Cl.
  CPC ...... *G02F 1/13306* (2013.01); *G02F 1/13439* (2013.01); *G02F 1/133512* (2013.01); *E06B 2009/2464* (2013.01); *G02F 1/13312* (2021.01); *G02F 1/13324* (2021.01); *G02F 1/133374* (2021.01); *G02F 2201/083* (2013.01); *G02F 2201/086* (2013.01); *G02F 2201/44* (2013.01); *G02F 2201/50* (2013.01)

(56) References Cited

U.S. PATENT DOCUMENTS

| | | | |
|---|---|---|---|
| 5,963,282 A | 10/1999 | Battersby | |
| 6,039,390 A * | 3/2000 | Agrawal | B32B 17/10036 296/211 |
| 8,248,680 B2 * | 8/2012 | Brown | B60R 1/088 359/265 |
| 9,606,409 B2 * | 3/2017 | Berland | G02F 1/153 |
| 2002/0005977 A1 | 1/2002 | Guarr et al. | |
| 2002/0021481 A1 * | 2/2002 | Lin | B60R 25/1004 359/265 |
| 2002/0186569 A1 * | 12/2002 | Strazzanti | B60Q 1/00 362/464 |
| 2004/0233502 A1 * | 11/2004 | Brabec | E06B 9/24 359/275 |
| 2010/0297456 A1 | 11/2010 | Tano et al. | |
| 2011/0169877 A1 * | 7/2011 | Ishida | G02F 1/1334 345/690 |
| 2011/0279755 A1 * | 11/2011 | Nittou | A63F 13/08 349/77 |
| 2013/0201316 A1 * | 8/2013 | Binder | H04L 67/12 348/77 |
| 2014/0132883 A1 * | 5/2014 | Roberts | G02F 1/1334 349/62 |
| 2014/0368899 A1 * | 12/2014 | Greer | E06B 9/24 359/275 |
| 2015/0070630 A1 * | 3/2015 | Kim | G02F 1/1334 349/86 |
| 2015/0337145 A1 * | 11/2015 | Torrisi | C09D 11/02 428/207 |
| 2017/0269400 A1 * | 9/2017 | Northrup | G02F 1/1334 |
| 2017/0307916 A1 * | 10/2017 | Hakemi | G02F 1/1334 |
| 2017/0323990 A1 * | 11/2017 | Yu | G02F 1/163 |

FOREIGN PATENT DOCUMENTS

| | | | | |
|---|---|---|---|---|
| CN | 101323191 A | | 12/2008 | |
| CN | 201425688 Y | | 3/2010 | |
| CN | 203063630 U | | 7/2013 | |
| CN | 103991366 A | | 8/2014 | |
| CN | 203786419 U | | 8/2014 | |
| CN | 204834645 U | | 12/2015 | |
| CN | 105652503 A | | 6/2016 | |
| CN | 106405881 A | | 2/2017 | |
| EP | 2 956 322 A1 | | 12/2015 | |
| JP | 2002016276 A | | 1/2002 | |
| KR | 20100092745 A | * | 8/2010 | ........... G02F 1/1523 |
| KR | 20100092745 A | | 8/2010 | |
| KR | 20120045543 A | * | 5/2012 | ........... G02F 1/1334 |
| WO | 2016/126693 A1 | | 8/2016 | |

OTHER PUBLICATIONS

Office Action dated Sep. 5, 2018, issued in counterpart Chinese Application No. 201601788737.3, with English translation (35 pages).

Zhou Zhimin, et al., Solar photovoltaic system design and engineering examples, China Electric Power Press, Jul. 2016 (18 pages).

Office Action dated May 13, 2019, issued in counterpart CN application No. 201610788737.3, with English translation. (27 pages).

Office Action dated Mar. 13, 2020, issued in counterpart IN Application No. 201717038300, with English translation. (7 pages).

Extended (Supplementary) European Search Report dated Apr. 22, 2020, issued in counterpart EP Application No. 17748619.8. (10 pages).

\* cited by examiner

OPTICAL ASSEMBLY, OPTICAL DEVICE, AND MANUFACTURING METHOD THEREOF

CROSS-REFERENCE TO RELATED APPLICATIONS

This application claims the benefit of the filing date of Chinese Patent Application No. 201610788737.3 filed on 2016 Aug. 31, the disclosure of which is hereby incorporated by reference.

FIELD OF THE INVENTION

This invention relates to optical technology, and more particularly, to an optical assembly, an optical device, and manufacturing method thereof.

BACKGROUND OF THE INVENTION

With rapid economic development, car usage is getting higher and higher. A majority of automotive interior parts are made of plastics or leather, and more parts are using a glue bonding. As an ordinary window glass has almost no insulation effect, after a long exposure to the sun, the car's interior parts more likely suffer from aging and deformation. In severe cases, this will also affect working conditions of other normal parts.

In addition, although an ordinary window glass in the prior art may block some of the ultraviolet (UV) rays, there is still a small amount of the UV rays entering the car. As both sides of a driver's body are near the window, and exposed to ultraviolet light for a long time, such exposure can significantly increase the risk of skin cancer on the sides of the driver's body.

In order to solve the above problem, at present, a commonly used method is to attach a reflective metal insulation composite film or a low-radiation coating layer on an inner surface of the car's window to achieve the effect of temperature control.

BRIEF SUMMARY

Accordingly, one example of the present invention is an optical assembly. The optical assembly comprises a first substrate and a second substrate opposite the first substrate. A dimming structure is disposed between the first substrate and the second substrate. A light shielding structure is disposed on a surface of the second substrate opposite to the first substrate. The light shielding structure is configured to absorb at least one of ultraviolet light, near-ultraviolet light, infrared light, or far-infrared light in the sunlight and output an electrical control signal, and the dimming structure is configured to adjust light transmittance in response to the electrical control signal.

The optical assembly may further comprise a third substrate opposite the second substrate. The light shielding structure may comprise a light absorbing layer; a first transparent electrode; and a second transparent electrode. The first transparent electrode is disposed on a surface of the second substrate toward the third substrate, the second transparent electrode is disposed on a surface of the third substrate toward the second substrate, and the light absorption layer is disposed between the first transparent electrode and the second transparent electrode. The light absorption layer is configured to absorb at least ultraviolet light in the sunlight and convert energy of the absorbed light into electrical energy. The first transparent electrode and the second transparent electrode are configured to output the electric energy as an electrical control signal.

The first transparent electrode and the second transparent electrode may each independently include a single-layer indium tin oxide (ITO), a single-layer of indium zinc oxide (IZO), or an ITO and IZO composite film. The light absorption layer may absorb at least one of ultraviolet light, near-ultraviolet light, infrared light, or far-infrared light in the sunlight.

The optical assembly may further comprise a controller electrically connected to the dimming structure and the light shielding structure. The light shielding structure is configured to output an electrical control signal. The controller is configured to receive the electric control signal outputted flour the light shielding structure and output a control signal to the dimming structure.

The dimming structure may comprise a third transparent electrode located on a surface of the first substrate toward the second substrate, a fourth transparent electrode located on a surface of the second substrate toward the first substrate, and a polymer dispersed liquid crystal layer disposed between the third transparent electrode and the fourth transparent electrode. The third transparent electrode and the fourth transparent electrode are configured to receive a control signal to control light transmittance of the polymer dispersed liquid crystal layer.

The control signal may comprise a current signal or a voltage signal. The light transmittance of the polymer dispersed liquid crystal layer increases as the corresponding current value of the current signal or the corresponding voltage value of the voltage signal increases.

The polymer dispersed liquid crystal layer may be divided into a plurality of regions, and light transmittance of the polymer dispersed liquid crystal layer in each of the plurality of regions may be different. Alternatively, light transmittance of the polymer-dispersed liquid crystal layer of some of the plurality of regions may be different from that of other remaining regions. The profile of each of the plurality of regions may be set to a specific shape such as a shape of a logo. The dimming structure may be configured for explosion protection.

Another example of the present invention is an optical device comprising the optical assembly according to one embodiment of the present invention. The optical device may be a car window, a window for a building, or a glass lens.

Another example of the present invention is a method of manufacturing an optical assembly. The method may comprise forming a dimming structure between a first substrate and a second substrate opposite the first substrate and forming a light shielding structure on the second substrate. The light shielding structure is configured to absorb at least one of ultraviolet light, near-ultraviolet light, infrared light, or far-infrared light in the sunlight and output an electrical control signal, and the dimming structure is configured to adjust light transmittance in response to the electrical control signal The step of forming the light shielding structure on the second substrate may comprise forming a first transparent electrode on a surface of the second substrate opposite to the first substrate, forming a light absorption layer on the first transparent electrode for absorbing at least ultraviolet light in the sunlight and converting energy of the absorbed light into electrical energy, forming a second transparent electrode on a third substrate, and combining the second substrate and the third substrate. The second transparent electrode faces the second substrate. The first transparent electrode and the second transparent electrode are configured to output electrical energy converted by the light absorbing layer as an electrical control signal.

The step of forming the dimming structure between the opposing first substrate and the second substrate may include forming a third transparent electrode on the first substrate, and a fourth transparent electrode on the second substrate, combining the first substrate and the second substrate to form a cell, wherein the third transparent electrode faces the second substrate, and the fourth transparent electrode faces the first substrate, filling polymer dispersed liquid crystals between the first substrate and the second substrate, and forming a polymer dispersed liquid crystal layer through a polymerization process. The third transparent electrode and the fourth transparent electrode are configured to receive an electrical control signal to control light transmittance of the polymer dispersed liquid crystal layer.

The step of forming the polymer dispersed liquid crystal layer by a polymerization process may comprise irradiating the polymer dispersed liquid crystals with ultraviolet light to form the polymer dispersed liquid crystal layer.

The electrical control signal may comprise a current signal or a voltage signal, and the light transmittance of the polymer dispersed liquid crystal layer increases as the corresponding current value of the current signal or the corresponding voltage value of the voltage signal increases.

The step of forming the polymer dispersed liquid crystal layer by a polymerization process may comprise partially blocking the polymer dispersed liquid crystals using a light-shielding member, and after the blocking, irradiating the polymer dispersed liquid crystals with ultraviolet light to form a polymer dispersed liquid crystal layer. The light-shielding member may be divided into a plurality of regions, each of the regions having a different transmittance to the ultraviolet light, or light transmittance of some of the regions to the ultraviolet light may be different from that of the remaining regions to the ultraviolet light. The profile of each of the regions may be set to a specific shape such as a shape of a Logo.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-8. When referring to the figures, like structures and elements shown throughout are indicated with like reference numerals. Obviously, the described embodiments are only a part of the embodiments of the present invention, and not all of the embodiments. All other embodiments obtained by those of ordinary skill in the art based on the embodiments of the present invention are within the scope of the present invention.

The thicknesses, the sizes of areas, and shapes of the layers in the drawings do not reflect the true proportions of the respective layers, the purpose of which is merely to illustrate the present invention.

Embodiments of the present invention provide an optical assembly and a manufacturing method thereof, and an optical device. The optical assembly in accordance with one embodiment of the present invention is configured to better utilize solar radiation energy and provide better shielding from ultraviolet radiation.

Figure 1:
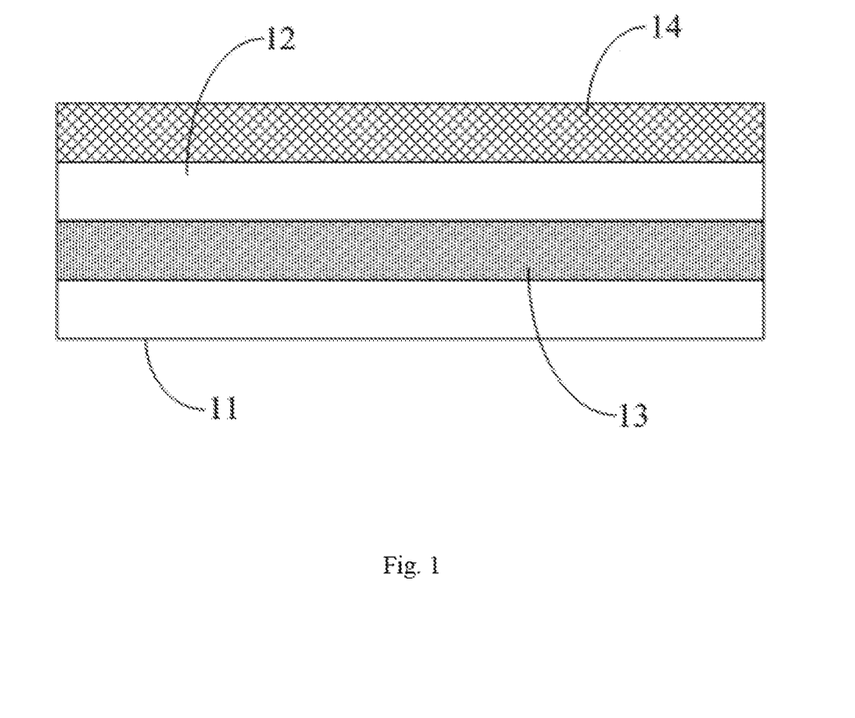
FIG. 1 is a schematic structural view of an optical assembly according to one embodiment of the present invention.

FIG. 1 shows an optical assembly in accordance with one embodiment of the present invention. The optical assembly includes a first substrate 11, a second substrate 12 opposite the first substrate 11, a dimming structure 13 disposed between the first substrate 11 and the second substrate 12, and a light shielding structure 14 disposed on the second substrate 12.

The dimming structure 13 is used for controlling light transmittance according to a control signal received. The light shielding structure 14 is used for absorbing at least ultraviolet light in the sunlight.

In the specific implementation, the first substrate 11 and the second substrate 12 in one embodiment of the present invention may be transparent substrates, such as glass substrates; or may be substrates having different degrees of light transmittance depending on actual needs.

According to an optical assembly in accordance with one embodiment of the present invention, since the optical assembly comprises a light shielding structure 14 having an absorption effect for ultraviolet light, it can effectively not only utilize solar radiation energy, but also shield ultraviolet radiation.

Figure 2:
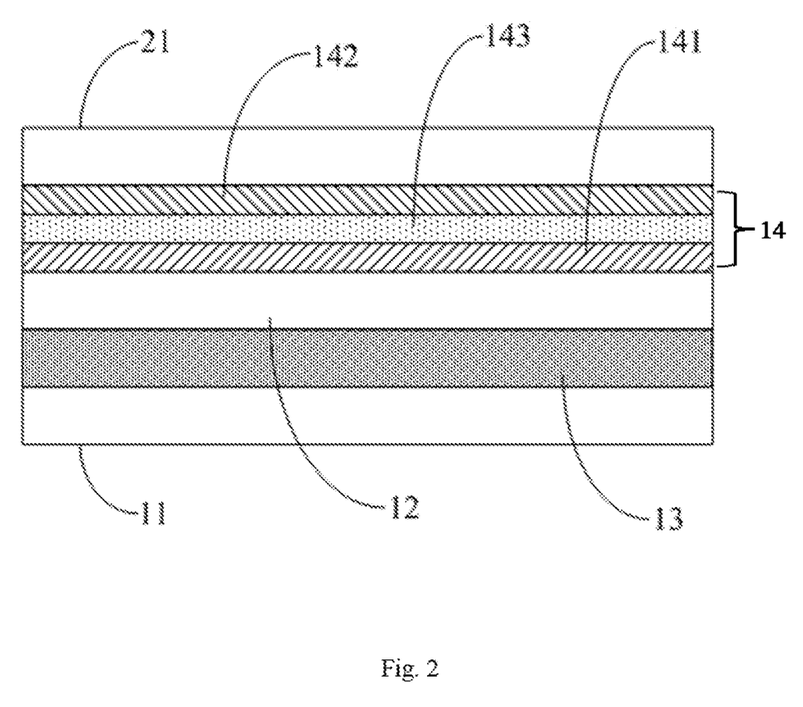
FIG. 2 is a schematic structural view of an optical assembly according to one embodiment of the present invention.

Specifically, the light shielding structure 14 in accordance with one embodiment of the present invention includes a light-absorbing layer 143, as shown in FIG. 2. The light absorbing layer 143 serves to absorb at least ultraviolet light in the sunlight, and convert the absorbed light energy into electrical energy. In a specific implementation, the light absorbing layer in the specific embodiment of the present invention absorbs at least one of ultraviolet light, near ultraviolet light, infrared light, and far-infrared light in the sunlight. In this way, the utilization rate of solar radiation energy is further improved.

Examples of the light absorbing layer include, but not limited to, inorganic semiconductor materials such as Co/Mn/Zn doped GaN; perovskite crystals such as $KNbO_3$, NiNbO$_3$, and SrTiO$_3$; and organic materials such as porphyrin derivatives and polythiophene derivatives.

FIG. 2 shows an optical assembly in accordance with one embodiment of the present invention. The optical assembly further includes a third substrate 21 disposed opposite to the second substrate 12. In one embodiment, the light shielding structure 14 includes a first transparent electrode 141, a second transparent electrode 142, and a light absorbing layer 143. The first transparent electrode 141 is disposed on a side of the second substrate 12 toward the third substrate 21. The second transparent electrode 142 is disposed on a side of the third substrate 21 toward the second substrate 12. The light absorbing layer 143 is disposed between the first transparent electrode 141 and the second transparent electrode 142. The light absorbing layer 143 serves to absorb at least ultraviolet light in the sunlight, and convert the absorbed light energy into electrical energy. The first transparent electrode 141 and the second transparent electrode 142 are used for outputting the electrical energy converted by the light absorbing layer 143 as an electrical signal. Specifically, the electric energy converted by the light absorbing layer 143 may be outputted as a current signal or a voltage signal.

Preferably, the first substrate, the second substrate, and the third substrate in the specific embodiment of the present invention are transparent substrates, such as: glass substrates. Using glass substrates as transparent substrates makes it more convenient and simpler in the actual manufacturing process, and enables the optical assembly to be more widely used, e.g. in a car window.

In one embodiment, the light shielding structure comprises a first transparent electrode, a second transparent electrode, and a light absorbing layer which form a solar cell. The formed solar cell is capable of converting the received sunlight energy into electrical energy, and outputting the converted electric energy as a current signal or a voltage signal.

Figure 3:
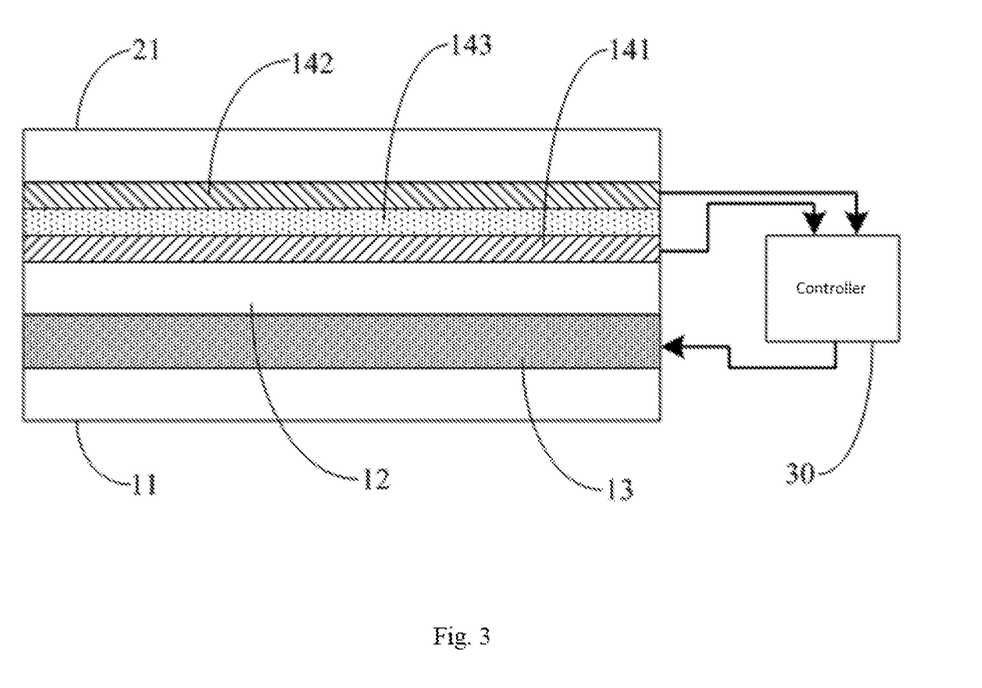
FIG. 3 is a schematic structural view of another optical assembly according to on embodiment of the present invention.

FIG. 3 shows an optical assembly in accordance with one embodiment of the present invention. The optical assembly further includes a controller 30. The controller 30 is electrically connected to the dimming structure 13, the first transparent electrode 141 and the second transparent electrode 142. The controller may receive a current signal or a voltage signal outputted from the first transparent electrode 141 and the second transparent electrode 142, and output a control signal to the dimming structure 13.

The current signal or the voltage signal outputted from the first transparent electrode 141 and the second transparent electrode 142 in accordance with one embodiment of the present invention can be fed back to the dim in structure 13 through the controller 30, so as to adjust the light transmittance. As such, it is not necessary to separately provide a control signal to the dimming structure 13, thereby achieving an effect of intelligent control of light transmittance.

Figure 4:
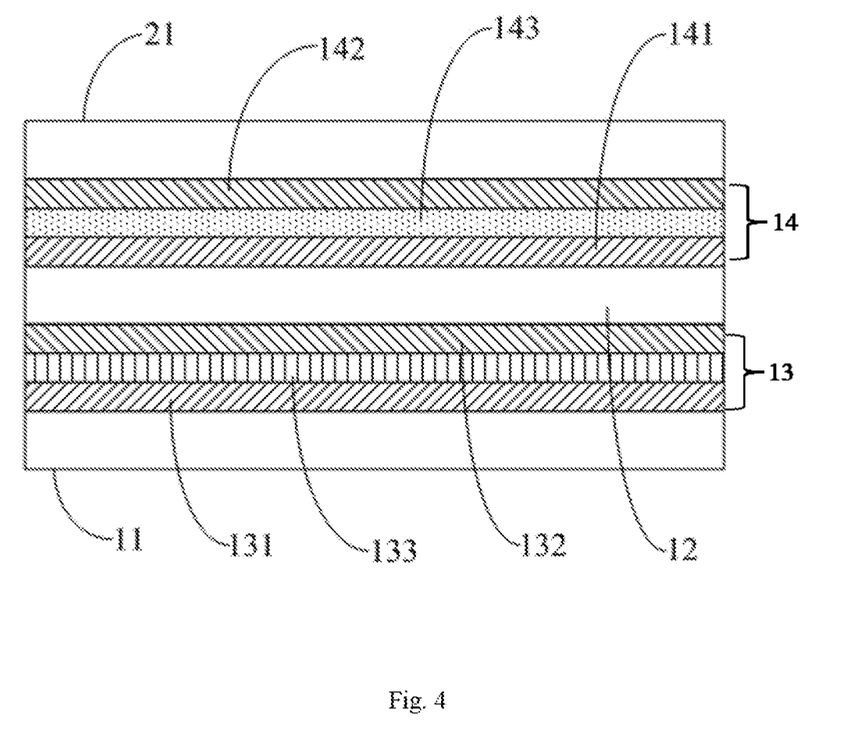
FIG. 4 is a schematic structural view of another optical assembly according to one embodiment of the present invention.

FIG. 4 shows an optical assembly in accordance with one embodiment of the present invention. The optical assembly includes a dimming structure 13, as shown in FIG. 4. The dimming structure 13 in one embodiment of the present invention includes a third transparent electrode 131 disposed on a side of the first substrate 11 toward the second substrate 12, a fourth transparent electrode 132 disposed on a side of the second substrate 12 toward the first substrate 11, and a polymer-dispersed liquid crystal layer 133 disposed between the third transparent electrode 131 and the fourth transparent electrode 132. The third transparent electrode 131 and the fourth transparent electrode 132 are used for receiving a control signal to control light transmittance of the polymer-dispersed liquid crystal layer 133.

The materials of the first transparent electrode, the second transparent electrode, the third transparent electrode and the fourth transparent electrode are the same material in one embodiment of the present invention. The material of the first transparent electrode, the second transparent electrode, the third transparent electrode, and the fourth transparent electrode each is a single-layer indium tin oxide (ITO) film a single-layer of indium zinc oxide (IZO) film, or an ITO and IZO composite film. In the actual production process, the first transparent electrode, the second transparent electrode, the third transparent electrode, and the fourth transparent electrode in the specific embodiment of the present invention may also be other transparent conductive thin films.

Light transmittance of the polymer dispersed liquid crystal layer 133 in accordance with one embodiment of the present invention increases as the corresponding current value of the current signal or the corresponding voltage value of the voltage signal outputted from the third transparent electrode 131 and the fourth transparent electrode 132 increases. When the current or voltage value is zero, it is in a non-transparent state. When it is in a powered state, the polymer dispersed liquid crystal layer 133 exhibits a transparent, open state. When it is not in a powered state, the polymer dispersed liquid crystal layer 133 exhibits a non-transparent, light-scattering, closed state, effectively scattering visible and infrared light and shielding most of heat in the sunlight. The light transmittance of the polymer dispersed liquid crystal layer 133 may be controlled by the corresponding current value of the current signal or the corresponding voltage value of the voltage signal outputted from the third transparent electrode 131 and the fourth transparent electrode 132 to achieve the dimming effect.

In the actual production process, the optical assembly may also realize a personalized pattern mark (LOGO) or an advertising effect. In one embodiment, when the polymer dispersed liquid crystal layer is formed by light irradiating polymer-dispersed liquid crystals, the polymer dispersed liquid crystals can be partially blocked, and the blocked regions cannot be irradiated with light. In the following powered state, the blocked region will still maintain a non-transparent, light-scattering state, and thus, customization of a personalized pattern can be achieved.

In one embodiment, the polymer dispersed liquid crystal layer 133 may be divided into a plurality of regions. Light transmittance of the polymer dispersed liquid crystal layer 133 in each of the regions may not be the same, or light transmittance of the polymer dispersed liquid crystal layer 133 of some regions is different from that of the other remaining regions. In one embodiment of the present invention, the light transmittance of the polymer-dispersed liquid crystal layer 133 of each region increases as the current value or the voltage value increases.

In one embodiment, preferably, the profile of each region is set to be a particular shape. This shape may correspond to a shape of a LOGO.

Figure 5:
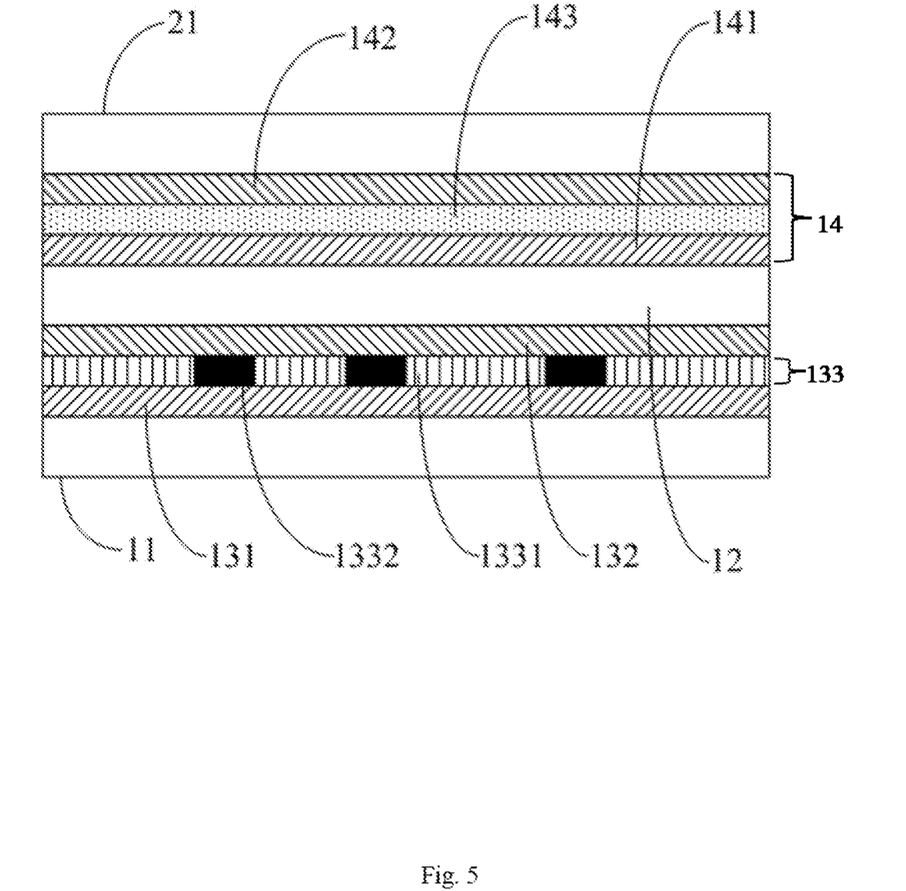
FIG. 5 is a schematic view of a specific configuration of an optical assembly according to one embodiment of the present invention.

FIG. 5 shows an optical assembly in accordance with one embodiment of the present invention. For purposes of illustration, the polymer dispersed liquid crystal layer 133 is divided into two regions of a first region 1331 and a second region 1332 as an example. The first region 1331 is in a transparent state when the corresponding current value of the current signal or the corresponding voltage value of the voltage signal outputted from the third transparent electrode 131 and the fourth transparent electrode 132 is not zero and light transmittance of the first region 1331 increases as the current value or the voltage value increases. The second region 1332 is in a non-transparent state, that is, when the polymer dispersed liquid crystal layer is formed by light irradiation of polymer dispersed liquid crystals, the polymer dispersed liquid crystals are blocked at the position corresponding to the second region 1332. In one embodiment, a single layer of polymer dispersed liquid crystal layer, which has a high light transmittance in an open state, is employed to achieve a control of dimming by voltage.

Another example of the present invention provides an optical device. The optical device comprises the above-described optical assemblies provided in a specific embodiment of the present invention. Specifically, the optical device may be a car window, or an external window of a building, or a glass lens.

The following is an example in which an optical device in accordance with one embodiment of the present invention is an automotive window. There are several advantages of the window with respect to a conventional window of the prior art:

First, the window in accordance with one embodiment of the present invention may include a light shielding structure capable of absorbing ultraviolet light. The window can absorb most of the UV light, thereby protecting human skin. Furthermore, the light shielding structure does not affect transparency of the glass window, and thus will not affect normal driving of a driver. The shielding structure can not only make full use of solar energy, but also feed generated current signals or voltage signals back to the dimming structure, so that the light transmittance of the window may be adjusted or controlled, thereby achieving the effect of intelligent windows.

Second, when the dimming structure is not powered up, the dimming structure is in a light scattering state. This is equivalent to a physical reflective film in the prior art, thereby reducing the impact of specular reflection and achieving safe driving.

Third, as the sunlight may affect a driver's sight and increase temperature in the car, light transmittance of the window can be adjusted by adjusting the voltage applied to the dimming structure during driving in the day time. For example, light transmittance of a window can be continuously changed between 5% and 95%, and thus can satisfy light transmittance requirements of the glass window under a variety of weather conditions.

Fourth, when a vehicle is in a parked state, the dimming structure maintains the scattering state without any need of electrical power. This may effectively shield sunlight, reduce the temperature inside the car, and realize an effect of anti-theft. In addition, because the polymer dispersed liquid crystal layer in the diming structure may be a polymeric thin film, this can effectively prevent the glass windows from splashing and wounding people when broken, thereby improving the safety performance of the window and achieving an excellent explosion-proof effect.

Fifth, through a technique of blocking exposure, the polymer dispersed liquid crystal layer in the dimming structure can be patterned. The areas that are not exposed are not controlled by the electric field, thus, the scattering state is maintained in those areas regardless of whether or not a power is applied, thereby capable of achieving personalized patterns or advertising effects.

Sixth, when a vehicle is not driven for a long time, it is likely that the battery is short of power, and accordingly the vehicle may not start. Then, the light-shielding structure in accordance with one embodiment of the present invention may allow for emergency charging of the battery.

Figure 6:
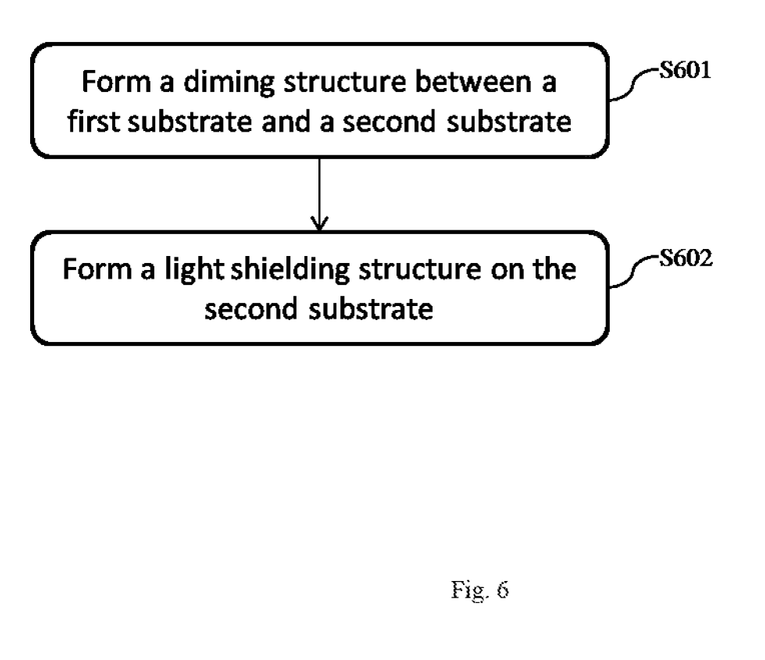
FIG. 6 is a flowchart of a method for manufacturing an optical assembly according to one embodiment of the present invention.

FIG. 6 shows a method of manufacturing an optical assembly in accordance with one embodiment of the present invention. The method may include the following steps:

At step S601, a diming structure is formed between a first substrate and a second substrate. The dimming structure is used for controlling transmittance of light through a control signal received.

At step S602, a light shielding structure is formed on the second substrate. The light shielding structure is used for absorbing at least ultraviolet light in the sunlight.

Figure 7:
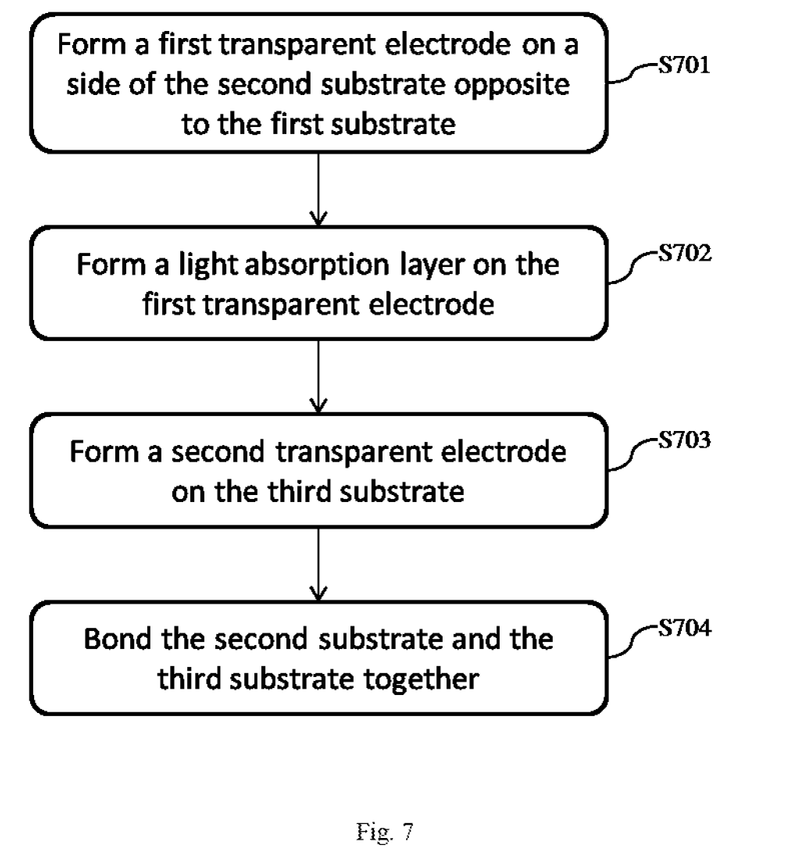
FIG. 7 is a flow chart of a method of manufacturing a light shielding structure included in an optical assembly according to one embodiment of the present invention.

FIG. 7 shows a method of manufacturing a light shielding structure on a second substrate in accordance with one embodiment of the present invention. The method includes the following:

At step S701, a first transparent electrode is formed on a side of the second substrate facing away from the first substrate.

At step S702, a light absorption layer is formed on the first transparent electrode. The light absorption layer may be used for absorbing at least ultraviolet light in the sunlight, and converting the absorbed light energy into electrical energy.

At step S703, a second transparent electrode is formed on the third substrate.

At step S704, the second substrate and the third substrate are bonded together, wherein the second transparent electrode faces the second substrate. The first transparent electrode and the second transparent electrode are used for outputting an electrical energy converted by the light absorbing layer in a form of electrical signal.

Figure 8:
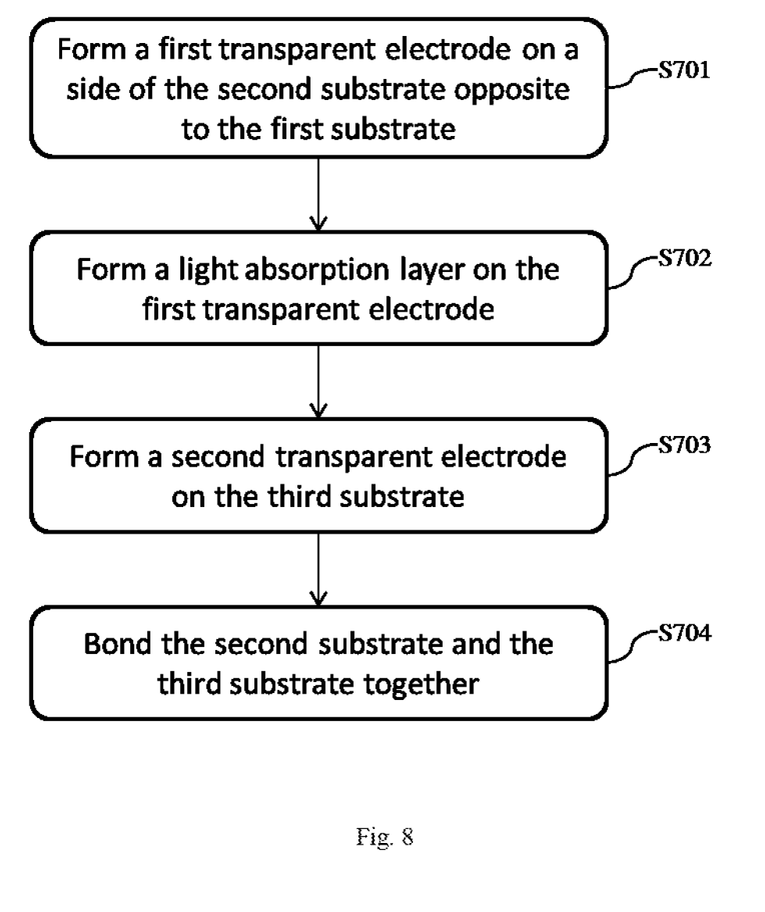
FIG. 8 is a flow chart of a method of manufacturing a dimming structure included in an optical assembly according to one embodiment of the present invention.

FIG. 8 shows a method of manufacturing a dimming structure in accordance with one embodiment of the present invention. The dimming structure may be formed between a first substrate and a second substrate opposite the first substrate. The method includes:

At step S801, a third transparent electrode is formed on the first substrate, and a fourth transparent electrode is formed on the second substrate.

At step S802, the first substrate and the second substrate are assembled together to form a cell, wherein the third transparent electrode faces the second substrate and the fourth transparent electrode faces the first substrate.

At step S803, polymer dispersed liquid crystals are filled between the first substrate and the second substrate, and a polymer dispersed liquid crystal layer is formed by a polymerization process.

The third transparent electrode and the fourth transparent electrode are used for receiving a control signal, and control the light transmittance of the polymer dispersed liquid crystal layer.

In specific embodiments of the present invention, a polymer dispersed liquid crystal layer is formed through the polymerization process. It includes forming a polymer dispersed liquid crystal layer by irradiating the polymer dispersed liquid crystals with UV light. The light transmittance of the polymer dispersed liquid crystal layer may increase as the corresponding current value of the current signal or the corresponding voltage value of the voltage signal increases.

In the actual production process, the optical assembly in accordance with embodiments of the present invention may also realize a personalized LOGO or advertising effect. In one embodiment, a polymer dispersed liquid crystal layer is formed by a polymerization process. During the polymerization process, polymer dispersed liquid crystals are partially blocked by a light shielding member. After blocking, the polymer dispersed liquid crystals are irradiated with ultraviolet light to form a polymer dispersed liquid crystal layer. The light shielding member may be divided into a plurality of regions. Transmittance of each region to ultraviolet light may be unequal, or transmittance to the ultraviolet light in some regions is different from transmittance to the ultraviolet light of other regions.

Specifically, as shown in FIG. 5, in one embodiment, polymer dispersed liquid crystals are partially blocked by a light shielding member. After blocking, the polymer dispersed liquid crystals are irradiated with ultraviolet light to form a polymer dispersed liquid crystal layer. For example, a specific embodiment of the present invention includes shielding by a mask, thereby realizing the patterning of the polymer dispersed liquid crystal layer. In one embodiment, positions of the polymer dispersed liquid crystal layer in a non-transparent state may be set according to customers' settings, thereby satisfying needs of customers requiring personalized patterns.

Specifically, light transmittance of the polymer dispersed liquid crystal layer at positions corresponding to unmasked regions increases as the corresponding current value of the current signal or the corresponding voltage value of the voltage signal increases. The profile of each region may be set to a specific shape. The shape may be the same as a shape of LOGO.

In summary, embodiments of the present invention may provide an optical assembly, comprising a first substrate and a second substrate opposite the first substrate, a dimming structure between the first substrate and the second substrate, and a light shielding structure on the second substrate. The dimming structure is used for controlling light transmittance according to a control signal received; a light shielding structure is used for absorbing at least ultraviolet light in the sunlight. Since the optical assembly in one embodiment of the present invention comprises a light shielding structure, it can effectively absorb the ultraviolet light in the sunlight. This can effectively not only utilize solar radiation energy, but also shield ultraviolet radiation. In addition, the optical assembly in one embodiment of the present invention includes a dimming structure to control visible and near-infrared light, thereby controlling the vast majority of solar thermal energy.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optical assembly comprising:
a first substrate and a second substrate opposite the first substrate;
a dimming structure disposed between the first substrate and the second substrate; and
a light shielding structure disposed on an outer surface of the second substrate that faces away from to the first substrate;
wherein the light shielding structure absorbs ultraviolet light and transmits visible light, the light shielding structure does not affect visible transparency of the optical assembly, the light shielding structure outputs an electrical signal, and the dimming structure adjusts light transmittance in response to the electrical control signal,
the dimming structure comprises:
a third transparent electrode on a surface of the first substrate toward the second substrate;
a fourth transparent electrode on a surface of the second substrate toward the first substrate; and
a polymer dispersed liquid crystal layer between the third transparent electrode and the fourth transparent electrode;
wherein the third transparent electrode and the fourth transparent electrode are configured to receive the electrical control signal to control visible and near-infrared light transmittance of the polymer dispersed liquid crystal layer,
wherein the electrical control signal comprises a current signal or a voltage signal, the visible and near-infrared light transmittance of the polymer dispersed liquid crystal layer increases as the corresponding current value of the current signal or the corresponding voltage value of the voltage signal increases, and
wherein the polymer dispersed liquid crystal layer is divided into a plurality of regions, the plurality of regions share same electrodes, the same electrodes are the third transparent electrode and the fourth transparent electrode, and light transmittance of the polymer dispersed liquid crystal layer in each of the plurality of regions is different under a same control signal from the third transparent electrode and the fourth transparent electrode; or light transmittance of the polymer dispersed liquid crystal layer in some of the plurality of regions is different from that in other remaining regions under the same control signal from the third transparent electrode and the fourth transparent electrode.

2. The optical assembly according to claim 1, further comprising:
a third substrate opposite the second substrate;
the light shielding structure comprising:
a light absorbing layer;
a first transparent electrode; and
a second transparent electrode,
wherein the first transparent electrode is disposed on a surface of the second substrate toward the third substrate, the second transparent electrode is disposed on a surface of the third substrate toward the second substrate; the light absorption layer is disposed between the first transparent electrode and the second transparent electrode;
wherein the light absorption layer is configured to absorb the at least one of ultraviolet light, near-ultraviolet light, infrared light, or far-infrared light in the sunlight and convert energy of the absorbed light into electrical energy, and the first transparent electrode and the second transparent electrode are configured to output the electric energy as the electrical control signal.

3. The optical assembly according to claim 2, wherein the first transparent electrode and the second transparent electrode each independently are a single-layer indium tin oxide, a single-layer of indium zinc oxide, or a indium tin oxide and indium zinc oxide composite film.

4. The optical assembly according to claim 2, wherein the light absorption layer absorbs at least ultraviolet light in the sunlight.

5. The optical assembly according to claim 2, further comprising a controller electrically connected to the dimming structure and the light shielding structure;

the controller is configured to receive the electrical control signal outputted from the light-shielding structure and output the electrical control signal to the dimming structure.

6. The optical assembly as in claim 1, wherein a profile of each of the plurality of regions is set to be a shape of a logo.

7. The optical assembly as in claim 1, the dimming structure is configured for explosion protection.

8. An optical device comprising the optical assembly according to claim 1.

9. The optical device according to claim 8, wherein the optical device is a car window, a window for a building, or a glass lens.

10. The optical assembly according to claim 1, wherein the polymer dispersed liquid crystal layer is divided into a plurality of regions, the plurality of regions share same electrodes, the same electrodes are the third transparent electrode and the fourth transparent electrode, and light transmittance of the polymer dispersed liquid crystal layer in each of the plurality of regions is controlled by a same control signal from the third transparent electrode and the fourth transparent electrode.

11. The optical assembly according to claim 1, wherein the light shielding structure includes Co/Mn/Zn doped GaN, $KNbO_3$, $NiNbO_2$, $SrTiO_2$, porphyrin derivatives, or polythiophene derivative.

12. A method of manufacturing an optical assembly comprising:
forming a dimming structure between a first substrate and a second substrate opposite the first substrate; and
forming a light shielding structure on an outer surface of the second substrate that faces away from to the first substrate,
wherein the light shielding structure absorbs ultraviolet light and transmits visible light, the light shielding structure does not affect visible transparency of the optical assembly, the light shielding structure outputs an electrical signal, and the dimming structure adjusts light transmittance in response to the electrical control signal,
forming the dimming structure comprises:
forming a third transparent electrode on the first substrate and a fourth transparent electrode on the second substrate;
combining the first substrate and the second substrate to form a cell, the third transparent electrode facing the second substrate, and the fourth transparent electrode facing the first substrate;
filling polymer dispersed liquid crystals between the first substrate and the second substrate; and
forming a polymer dispersed liquid crystal layer through a polymerization process,
wherein the third transparent electrode and the fourth transparent electrode are configured to receive the electrical control signal to control visible and near-infrared light transmittance of the polymer dispersed liquid crystal layer, and
wherein the electrical control signal comprises a current signal or a voltage signal, the visible and near-infrared light transmittance of the polymer dispersed liquid crystal layer increases as the corresponding current value of the current signal or the corresponding voltage value of the voltage signal increases; and
wherein forming the polymer dispersed liquid crystal layer through the polymerization process comprises:
partially blocking the polymer-dispersed liquid crystals using a light-shielding member;
after the blocking, irradiating the polymer dispersed liquid crystals with ultraviolet light to form a polymer dispersed liquid crystal layer;
wherein the light-shielding member is divided into a plurality of regions, each of the regions having a different transmittance to the ultraviolet light; or light transmittance of some of the regions to the ultraviolet light is different from that of the remaining regions to the ultraviolet light.

13. The method of manufacturing an optical assembly according to claim 12, wherein forming the light shielding structure on the second substrate comprises:
forming a first transparent electrode on a surface of the second substrate opposite to the first substrate;
forming a light absorption layer on the first transparent electrode;
forming a second transparent electrode on a third substrate; and
combining the second substrate and the third substrate, the second transparent electrode facing the second substrate;
wherein the light absorption layer is configured to absorb at least ultraviolet light in sunlight and convert energy of the absorbed light into electrical energy, and the first transparent electrode and the second transparent electrode are configured to output the electrical energy converted by the light absorbing layer as the electrical control signal.

14. The method of manufacturing an optical assembly according to claim 12, wherein forming the polymer dispersed liquid crystal layer by a polymerization process comprises: irradiating the polymer dispersed liquid crystals with ultraviolet light to form the polymer dispersed liquid crystal layer.

15. The method of manufacturing an optical assembly according to claim 14, wherein the electrical control signal comprises a current signal or a voltage signal, and the light transmittance of the polymer dispersed liquid crystal layer increases as the corresponding current value of the current signal or the corresponding voltage value of the voltage signal increases.

16. The method of manufacturing an optical assembly according to claim 12, wherein the polymer dispersed liquid crystal layer is divided into a plurality of regions, the plurality of regions share same electrodes, the same electrodes are the third transparent electrode and the fourth transparent electrode, and light transmittance of the polymer dispersed liquid crystal layer in each of the plurality of regions is controlled by a same control signal from the third transparent electrode and the fourth transparent electrode.

* * * * *